C. G. BROMMER.
MACHINES FOR MIXING SPONGE-CAKE.

No. 178,404. Patented June 6, 1876.

UNITED STATES PATENT OFFICE.

CHARLES G. BROMMER, OF DETROIT, MICHIGAN.

IMPROVEMENT IN MACHINES FOR MIXING SPONGE-CAKE.

Specification forming part of Letters Patent No. 178,404, dated June 6, 1876; application filed September 18, 1874.

*To all whom it may concern:*

Be it known that I, CHARLES G. BROMMER, of Detroit, in the county of Wayne, and State of Michigan, have invented a new and useful Machine for Mixing Sponge-Cake, of which the following is a specification:

The object of my invention is to provide bakers and confectioners with a machine by means of which the sponge or dough of sponge-cake, which is principally composed of eggs and sugar, can be thoroughly and intimately mixed, and at the same time kept at the proper temperature; and to this end it consists in the combination of the operative parts, all as more fully hereinafter explained, the whole being arranged to operate as more fully hereinafter set forth.

Figure 1:
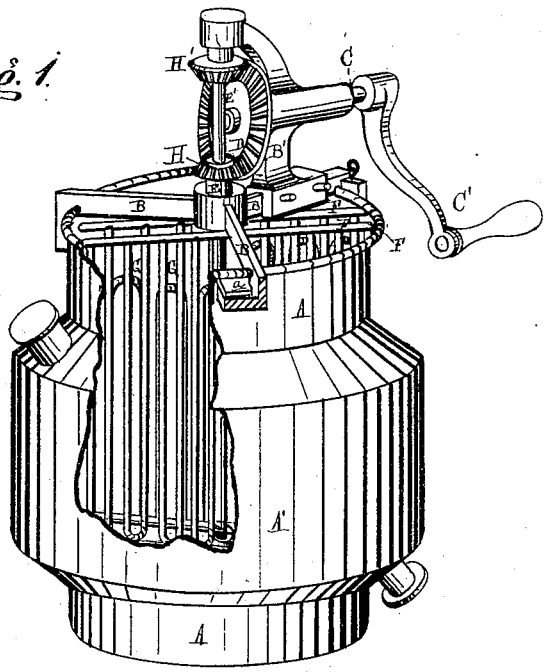
Figure 2:
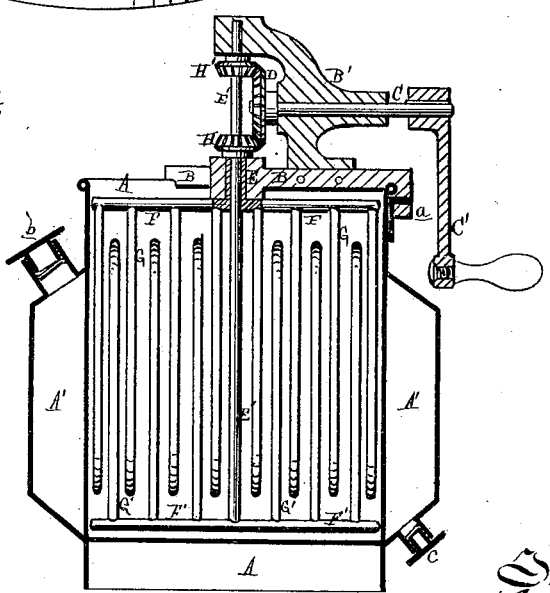

Figure 1 is a perspective view with portions broken away to show the interior arrangement. Fig. 2 is a vertical section.

In the drawing, A represents a cylindrical sheet-metal vessel, to the top of which a three-armed spider, B, is secured by sliding their hooked outer ends under inclined studs $a$, on the rim of the vessel, thereby allowing the spider and beaters to be removed previous to the removal of the dough. On one arm is secured a bracket, B', through a horizontal bearing in which I journal a horizontal shaft, C, having a crank, C', at the outer end, and a bevel-pinion, D, at the inner end. In the hub of the spider is journaled a hollow shaft, E, to whose lower end is secured a pair of cross-arms, F, parallel to each other and extending nearly from wall to wall. To these arms are secured the upper ends of U-shaped beaters G, pendent therefrom and arranged to follow in the wake of the plane of rotation, which is imparted by a pinion, H, at the top of the shaft E, which meshes with the pinion D at its lower edge. In the hollow shaft E and its pinion is a shaft, E', whose upper end is also journaled in the upper part of the bracket B'. This shaft extends nearly to the bottom of the vessel, where it has secured to it a pair of parallel horizontal cross-arms, F', which support a series of U-shaped beaters, G', which revolve in an opposite direction to and between the beaters G, the rotation being imparted to their shaft E', by a pinion, H', at its top, which meshes with the pinion D at its upper edge.

By turning the crank-shaft the beaters may be rapidly rotated in opposite directions to thoroughly mix and incorporate the ingredients of the vessel, and in mixing sponge-cake this process not only requires to be quickly completed, but the ingredients must be maintained at a high temperature; and, to secure it, I envelope the vessel A in a water-tight jacket, A', which I fill with hot-water through a screw-plug, $b$, at the top, when the sponge is charged into the vessel. The water may be drawn off through a screw-plug, $c$, in the bottom. If preferred, a continuous stream of hot water may be circulated through the jacket.

I am aware that hot-water jackets have been used for various purposes, and disclaim, broadly, their invention; but

What I claim as my invention, and desire to secure by Letters Patent, is—

In a cake-mixing machine the combination, with the vessel A, of the spider B, bracket B', shaft C, pinions D H H', shafts E E', cross-arms F F', and beaters G G', constructed and arranged to operate substantially as described and shown.

In testimony that the above is my invention I have hereunto set my hand this 31st July, 1874.

CHARLES G. BROMMER.

Witnesses:
 C. E. HUESTIS,
 H. F. EBERTS.